US011742653B2

(12) United States Patent
Nandy

(10) Patent No.: US 11,742,653 B2
(45) Date of Patent: Aug. 29, 2023

(54) INTEGRATED CIRCUIT MODULE FOR CIRCUIT BREAKERS, RELAYS AND CONTACTORS

(71) Applicant: SEMICONDUCTOR COMPONENTS INDUSTRIES, LLC, Phoenix, AZ (US)

(72) Inventor: Pramit Nandy, Chandler, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 409 days.

(21) Appl. No.: 17/019,799

(22) Filed: Sep. 14, 2020

(65) Prior Publication Data

US 2021/0135447 A1 May 6, 2021

Related U.S. Application Data

(60) Provisional application No. 62/930,101, filed on Nov. 4, 2019.

(51) Int. Cl.
*H02H 5/04* (2006.01)
*H02H 3/08* (2006.01)
(Continued)

(52) U.S. Cl.
CPC ............. *H02H 5/044* (2013.01); *H02H 3/04* (2013.01); *H02H 3/08* (2013.01); *G06F 1/3206* (2013.01)

(58) Field of Classification Search
CPC ........... H02H 5/044; H02H 5/04; H02H 3/04; H02H 3/08; G06F 1/3206
See application file for complete search history.

(56) References Cited

U.S. PATENT DOCUMENTS 10,276,321 B2 4/2019 Kennedy et al.
10,541,530 B2 1/2020 Kennedy et al.
(Continued)

FOREIGN PATENT DOCUMENTS

EP 0016646 B1 9/1983
WO WO-2021150684 A1 * 7/2021 ........... H02H 1/0015

OTHER PUBLICATIONS

K. Handt et al., "Intelligent, Compact and Robust Semiconductor Circuit Breaker on Silicon Carbide Devices", Power Electronics & Energy Management, 2008.

*Primary Examiner* — Sisay G Tiku
(74) *Attorney, Agent, or Firm* — Brake Hughes Bellermann LLP

(57) ABSTRACT

An integrated circuit breaker includes a solid state switching module (SSWM) configured to receive and switchable control a line power (LP) for a given phase, and output a first switched power (SP) to a load. A first sensor (LPS) senses LP currents. A second sensor (SPS) senses SP currents. A power module controls operating states of the SSWM based upon LPS and SPS reading(s). The LPS and/or the SPS may also sense temperatures. The power module includes a high voltage domain, isolated from a low voltage domain, that includes a gate driver coupled to the SSWM and a high voltage controller providing drive signals to the gate driver. The low voltage domain includes an LP monitor and an SP monitor that detects anomalous LP and/or SP conditions and communicates error signals to the high voltage domain and to users for reporting, diagnostic, and/or other purposes via an external communications module.

18 Claims, 6 Drawing Sheets

(51) Int. Cl.
*H02H 3/04* (2006.01)
*G06F 1/3206* (2019.01)

(56) References Cited

U.S. PATENT DOCUMENTS

| | | |
|---|---|---|
| 10,630,069 B2 | 4/2020 | Kennedy et al. |
| 2004/0212940 A1 | 10/2004 | Kugelman et al. |
| 2009/0195082 A1 | 8/2009 | Chen |
| 2013/0154391 A1 | 6/2013 | Urciuoli |
| 2014/0029152 A1 | 1/2014 | Mazzola et al. |
| 2015/0002975 A1 | 1/2015 | Rozman et al. |
| 2018/0277317 A1 | 9/2018 | Kennedy et al. |
| 2018/0301294 A1 | 10/2018 | Kennedy et al. |
| 2020/0106259 A1* | 4/2020 | Telefus .............. H03K 17/6872 |
| 2020/0365345 A1* | 11/2020 | Telefus ............. H02J 13/00022 |
| 2020/0365346 A1* | 11/2020 | Telefus .................... H02H 3/08 |
| 2020/0365356 A1* | 11/2020 | Telefus .................. H01H 71/04 |
| 2020/0366078 A1* | 11/2020 | Telefus .................. H01H 71/04 |
| 2020/0366079 A1* | 11/2020 | Telefus .................... H02M 1/08 |
| 2021/0226441 A1* | 7/2021 | Telefus .................... H02H 3/10 |

* cited by examiner

INTEGRATED CIRCUIT MODULE FOR CIRCUIT BREAKERS, RELAYS AND CONTACTORS

CROSS REFERENCE TO RELATED APPLICATIONS

The present application claims priority to and incorporates by reference, in its entirety, U.S. Provisional Application Ser. No. 62/930,101, filed on Nov. 4, 2019, in the name of inventor Pramit Nandy, and entitled "Integrated Circuit Module for Circuit Breakers and Protected Relays."

TECHNICAL FIELD

The technology described herein generally relates to electrical circuit breakers, relays, and contactors. More specifically, the technology described herein relates to integrated circuit modules for use in electrical circuit breakers, relays, and contactors.

BACKGROUND

Electrical circuit breakers, relays, and contactors commonly use electro-mechanical components that are configured to detect faulty and/or hazardous electrical circuit conditions and, in response thereto, cease the flow of electricity. Such electro-mechanical components, however, commonly suffer from one or more capability deficiencies such as having large footprint sizes, slow response times (as measured, for example, on a one-hundred or greater millisecond basis), varying reliability, limited if any in-rush detection capabilities, limited current sensing capabilities, limited to detection of conditions coincident with high temperatures in the component, limited phase imbalance detection capabilities, lack of remote monitoring, control and warning capabilities, limited ground fault, arc fault, hard short-circuit, over current and other detection capabilities, and otherwise. Further, such components often lack active cooling capabilities, have limited, if any, ability to perform diagnostics under line power failure scenarios, and otherwise. Accordingly, circuit breakers, relays, and contactors are needed which address these and other concerns.

SUMMARY

The various embodiments of the present disclosure describe integrated circuit modules for circuit breakers, relays, and other electrical contactors.

In accordance with at least one embodiment of the present disclosure, an integrated circuit breaker may include a first solid state switching module (SSWM(1)). The SSWM may be configured to receive a first line power having a first phase (LP(1)) from an electrical source. The SSWM(1) may be configured to switchable control the LP(1), and output a first switched power at the first phase (SP(1)), via an electrical circuit, to a load. The integrated circuit breaker may include a first line power sensor (LPS(1)), configured to sense at least one characteristic of the LP(1). The integrated circuit breaker may include a first switched power sensor (SPS(1)), configured to sense at least one characteristic of the SP(1). The integrated circuit breaker may include; a power module, coupled to each of the SSWM(1), the LPS (1), and the SPS(1), configured to control operating states of the SSWM(1) based upon at least one sensor reading received by the power module from at least one of the LPS(1) and the SPS(1).

The SSWM(1) may include at least one solid-state switch. The at least one solid-state switch may include at least one of: a silicon metal-oxide-semiconductor field-effect transistor (a "Si MOSFET") in a cascode configuration with a silicon carbide junction gate field effect transistor (a "SiC JFET"); a first silicon carbide metal-oxide-semiconductor field-effect transistor (a "SiC MOSFET"); a silicon super-junction metal-oxide-semiconductor field effect transistor (an "SJ FET"); and a gallium nitride high electron field effect transistor (a "GaN FET").

The LPS(1) may be configured to sense LP(1) currents and the SPS(1) may be configured to sense SP(1) currents. At least one of the LPS(1) and the SPS(1) may be configured to sense temperature. The LPS(1) and the SPS(1) may each further include at least one of: an integrated sensing field effect transistors (a "senseFET"); a sense resistor; a Hall-Effect current sensor; a current sense transformer; and a tunnel magneto resistance ("TMR") current sensor.

An integrated circuit breaker may include a second solid state switching module (SSWM(2)) configured to receive a second line power having a second phase (LP(2)) from the electrical source. The SSWM(2) may switchable control the LP(2), and output a second switched power at the second phase (SP(2)) to the load. The integrated circuit breaker may include a second line power sensor (LPS(2)) configured to sense at least one characteristic of the (LP(2)). The integrated circuit breaker may include a second switched power sensor (SPS(2)) configured to sense at least one characteristic of the SP(2). The power module may be further coupled to each of the SSWM(2), the LPS(2) and the SPS(2). The power module may be further configured to control operating states of the SSWM(1) and the SSWM(2) based upon at least one sensor reading received by the power module from at least one of the LPS(1), the LPS(2), the SPS(1), and the SPS(2).

An integrated circuit breaker may include a neutral line sensor configured to sense at least one characteristic of a neutral line providing an electrical return path from the load, via the electrical circuit, to the electrical source.

An integrated circuit breaker may include a power module with a high voltage domain and a low voltage domain. The low voltage domain may include a low voltage controller. The high voltage domain may include a gate driver coupled to the SSWM(1) and a high voltage controller, coupled to the gate driver, configured to provide high voltage control signals to the gate driver. The integrated circuit breaker may be configured, based on the high voltage control signals, such that the gate driver generates gate drive signals which configure one or more switches provided by the SSWM(1) into open circuit or closed circuit operating states. For at least one embodiment the integrated circuit breaker may include a high voltage communications element configured to facilitate communicative coupling of the high voltage controller with the low voltage controller.

An integrated circuit breaker may include a low voltage domain that includes a line power monitor, coupled to the LPS(1) and to the low voltage controller, configured to receive sensor readings from the LPS(1), monitor the received sensor readings, and generate at least one line power flag when an anomalous line power condition arises. The integrated circuit breaker may include a low voltage domain that includes a switched power monitor, coupled to the SPS(1) and the low voltage controller, configured to receive sensor readings from the SPS(1), monitor the received sensor readings, and generate at least switch power flag when an anomalous switch power condition is detected. The integrated circuit breaker may include a low voltage domain that includes a low voltage communications element configured to facilitate communicative coupling of the low voltage controller with the high voltage controller.

An integrated circuit breaker may include a low voltage domain that includes a temperature monitor. The temperature module may be configured to monitor temperatures of the SP(1). An integrated circuit breaker may include a low voltage domain that includes a power controller module that couples the low voltage domain with a backup power source. An integrated circuit breaker may include a low voltage domain that includes an external communications module that communicatively couples the integrated circuit breaker with an external control device.

An integrated circuit breaker may include a low voltage controller that may be configured to monitor operating conditions of the integrated circuit breaker, generate diagnostic data representative of the operating conditions, respond to commands received from the external control device, and communicate low voltage control signals to the high voltage controller.

An integrated circuit breaker may include use of low voltage control signals that result in a generation of gate drive signals which facilitate at least one of electrical power management operation.

An integrated circuit breaker may be used configure to perform one or more electrical power management operations. Such electrical power management operations may include at least one of wave-shaping, wave-balancing, fail safe operations, start-up operations, minimal power modes, emergency condition power downs, and charge pumping.

An integrated circuit breaker may be configured such that a voltage domain is electrically isolated from the low voltage domain.

An integrated circuit breaker may include a cooling element configured to provide at least one of active cooling and passive cooling to the integrated circuit breaker.

In accordance with at least one embodiment of the present disclosure, an integrated circuit relay module may include a first solid state switching module (SSWM(1)), configured to receive a first switched power having a first phase (SP(1)) from an electrical circuit, switchable control the SP(1), and output a first relay power at the first phase (RP(1)) to a load. The integrated circuit relay module may include a first relay power sensor (RPS(1))[156(1)], configured to sense at least one characteristic of the RP(1). The integrated circuit relay module may include a power module, coupled to each of the SSWM(1), and the RPS(1), configured to control operating states of the SSWM(1) based upon at least one sensor reading received by the power module from the RPS(1).

The integrated circuit relay module may include a surge protection module configured to shunt to a ground power surge arising on the SP(1).

The integrated circuit relay module may include a second solid state switching module (SSWM(2)), configured to receive a second switched power having a second phase (SP(2)) from the electrical circuit, switchable control the SP(2), and output a second relay power at the second phase (RP(2)) to the load. The integrated circuit relay module may include a second relay power sensor (RPS(2)), configured to sense at least one characteristic of the RP(2). The integrated circuit relay module may include a third solid state switching module (SSWM(3)), configured to receive a third switched power having a third phase (SP(3)) from the electrical circuit, switchable control the SP(3), and output a third relay power at the third phase (RP(3)) to the load. The integrated circuit relay module may include a third relay power sensor (RPS(3)), configured to sense at least one characteristic of the RP(3). The power module may be coupled to each of the SWSM(2), the SWSM(3), the RPS(2), and the RPS(3). The power module may be configured to control operating states of one or more of the SWSM(1), the SSWM(2), and the SWSM(3) based upon at least one sensor reading received from one or more of the RPS(1), the RPS(2), and the RPS(3).

The integrated circuit relay module may include a surge protection module configured to shunt to ground one or more power surges arising on one or more of the SP(1), the SP(2), and the SP(3).

The integrated circuit relay module may include a power module having a low voltage domain communicatively coupled to, and electrically isolated from, a high voltage domain. The low voltage domain may include a low voltage controller, a relay power monitor, coupled to each of the RPS(1), the RPS(2), and the RPS(3) and the low voltage controller. The relay power module may be configured to receive sensor readings from one or more of the RPS(1), the RPS(2), and the RPS(3), monitor the received sensor readings, and generate at least one relay power flag when an anomalous relay power condition is detected.

The integrated circuit relay module may include a low voltage communications element configured to facilitate communicative coupling of the low voltage domain with the high voltage domain. The integrated circuit relay module may include a temperature monitor configured to monitor temperatures of one or more of the RP(1), the RP(2), and the RP(3). The integrated circuit relay module may include a power controller module configured to couple at least the low voltage domain with a backup power source. The integrated circuit relay module may include an external communications module communicatively coupling the integrated circuit breaker with an external control device. The low voltage controller may be configured to monitor operating conditions of the integrated circuit relay module, generate diagnostic data representative of the operating conditions, respond to commands received from the external control device, and output low voltage control signals to the high voltage domain for facilitating control of operating states of one or more of the SSWM(1), SSWM(2), and SSWM(3).

The integrated circuit relay module may include a high voltage domain that is communicatively coupled to the SSWM(1), the SSWM(2), and the SSWM(3). The high voltage domain may include a gate driver configured to control the operating states of each of the SSWM(1), the SSWM(2), and the SSWM(3). The high voltage domain may include a high voltage controller, coupled to the gate driver, configured to provide high voltage control signals to the gate driver. For at least one embodiment and based on the high voltage control signals, the gate driver may be configured to generate gate drive signals which configure one or more switches provided by one or more of the SSWM(1), the SSWM(2), and the SSWM(3) into an open circuit operating state or a closed circuit operating state. The high voltage domain may include a high voltage communications element configured to facilitate communicative coupling of the high voltage controller with the low voltage controller. Low voltage control signals may result in a generation of gate drive signals which facilitate at least one of electrical power management operation comprising wave-shaping, wave-balancing, fail safe operations, start-up operations, minimal power modes, emergency condition power downs, and charge pumping.

In accordance with at least one embodiment of the present disclosure, a system, for controlling an electrical coupling of a load with a power source, may include an integrated circuit breaker configured to receive a line power from an electrical source and output a switched power. The system may include an electro-mechanical switch configured to receive the switched power from the integrated circuit breaker, provide an air gap between the electrical source and an electrical circuit, and output the switched power. The system may include an electrical circuit electrically coupled to the electro-mechanical switch and configured to receive and provide the switched electrical power to at least one of a first load and a second load. The system may include an integrated circuit relay module electrically coupled to the electrical circuit and configured to output a relay power. The system may be configured such that the first load receives the relay power from the integrated circuit relay module and the second load receives the switched power from the electrical circuit. The system may include use of an integrated circuit breaker configured to monitor, detect, and respond to at least one characteristic of the line power and the switched power. The system may include use of an integrated circuit breaker configured to monitor, detect, and responds to at least one characteristic of the relay power.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to integrated circuit modules for electrical circuit breakers, relays, and contactors.

Figure 1A:
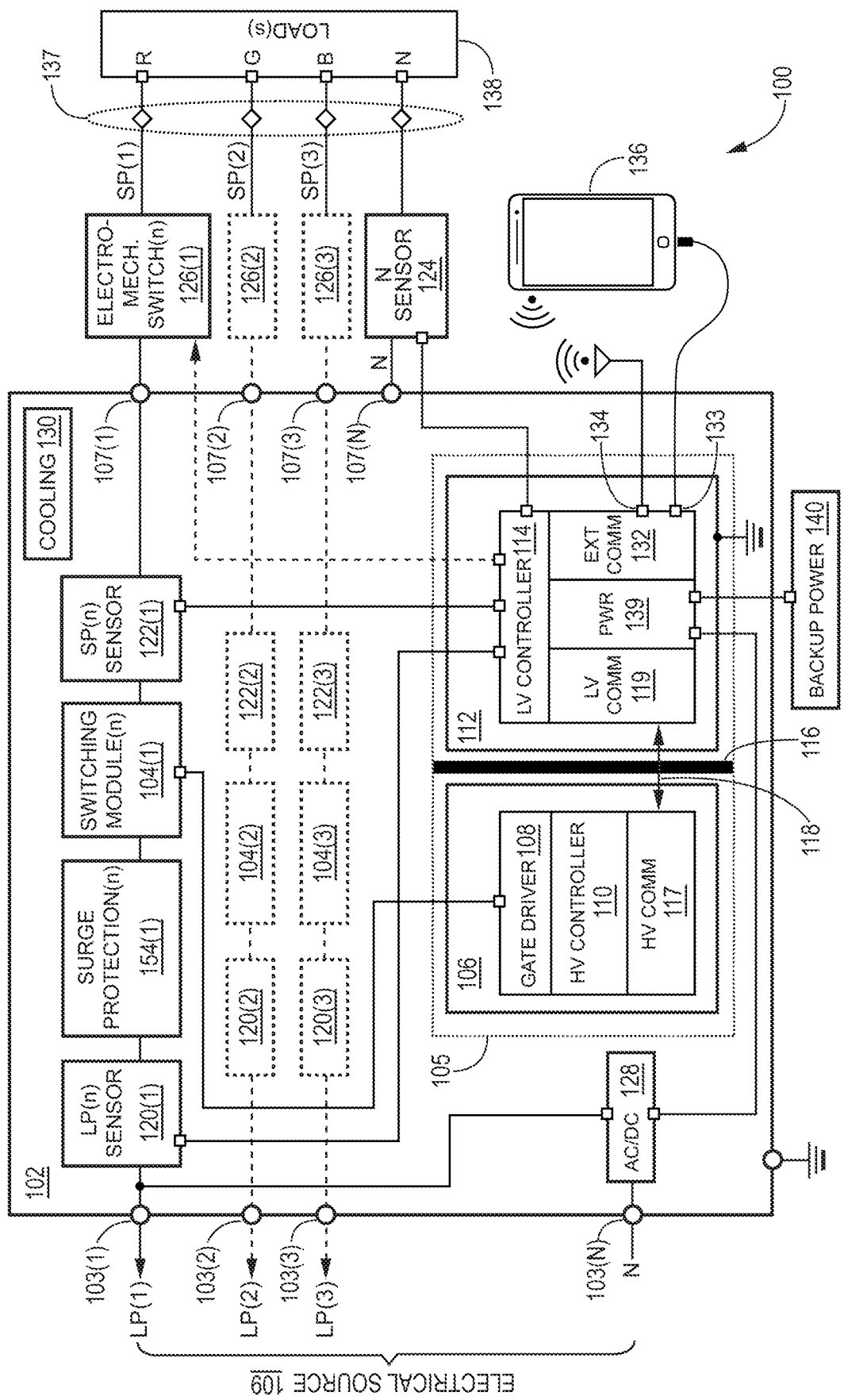
FIG. 1A is a functional block diagram of a system for using at least one of an integrated circuit breaker and in accordance with at least one embodiment of the present disclosure.
Figure 1B:
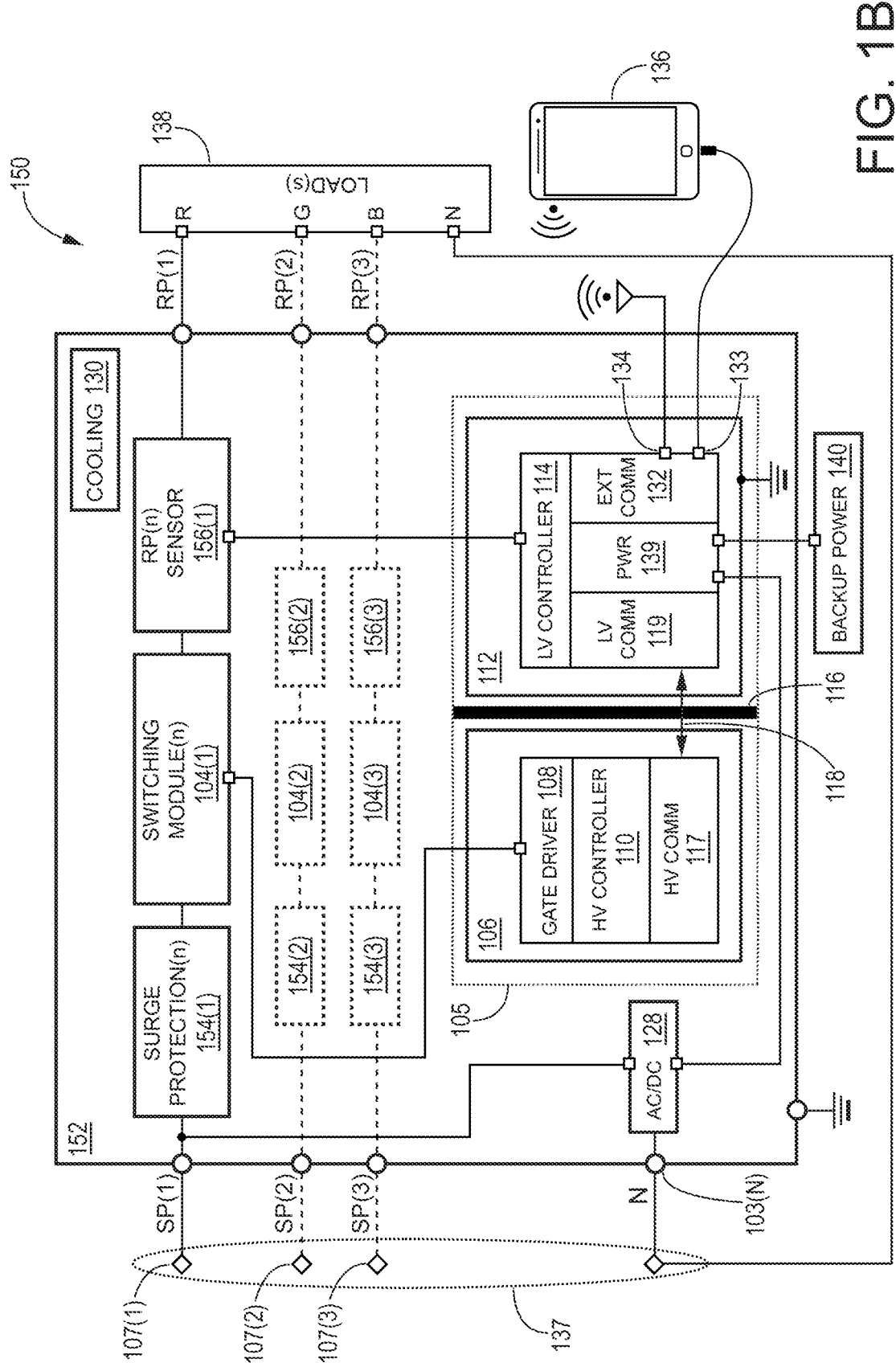
FIG. 1B is a functional block diagram of a system for using at least one of an integrated relay/contactor and in accordance with at least one embodiment of the present disclosure.

As shown in FIG. 1A and for at least one embodiment of the present disclosure, a system 100 for use with an alternating current power system, providing one or more phases, may include an integrated circuit breaker module "ICB" 102. As shown in FIG. 1B, and for at least one embodiment of the present disclosure, a system 150 for use with either an alternating current power system and/or a direct current power system, providing one or more phases, may include an integrated circuit relay/contactor module 152 (an "ICR").

As used herein, an ICB 102 is commonly used for coupling an electrical circuit 137 (as commonly configured, for a non-dedicated circuit, by the wiring exiting an electrical panel and terminating at one or more outlets (not shown)) with a source 109 of electricity, such as that provided at an electrical panel in a structure. The electricity may be provided by any provider such as by a power company via a power line, by a solar panel, or otherwise. The electrical circuit 137 is commonly located within a vehicle or structure. For non-dedicated circuits, the electrical circuit 137, includes one or more standard configuration outlets into which corresponding plugs for a load 138 may be physically and electrically connected. Dedicated electrical circuits may also be used. Commonly electricity is provided at one or more phases (n), where n is an integer. Often one to three phases of electricity are provided. Such electricity may be provided at various voltages and currents, such as 120 VAC per phase at 50 to 60 Hz, and as often specified by electrical codes, regulations, and otherwise.

As further used herein, an ICR 152 is commonly used for providing a switchable connection between an electrical circuit 137 (as accessed at one or more outlets) and one or more loads 138. The ICR 152 may be configured for use with or separate of a transformer (not shown). The use of transformers and configurations thereof are well known in the art. An ICR 152 differs from an ICB 102 primarily in its intended usage thereof, with an ICR 152 being configured into a parallel circuit relationship with a load 138 and with respect to electrical circuit 137 feeding multiple loads 138, while an ICB 102 is commonly used in a series circuit relationship between an electrical source 109 and an electrical circuit 137 powering the one or more load(s) 138. That is, it is to be appreciated that the ICR 152 is configured for use in monitoring and controlling electricity provided to a particular load 138 using an existing electrical circuit 137, while the ICB 102 is directed to monitoring and controlling electricity made available by a given electrical circuit 137, such as a household electrical circuit providing 120 VAC in the United States to any of various household appliances, and at various times. Further, it is to be appreciated that ICR 152 and ICB 102 may be configured for use with circuits and loads configured for use with any desired voltages including, but not limited to, 230 VAC (as commonly used in the European Union and other countries) and/or in any desired number of circuit phases, such as three phase circuits commonly used in the United States for residential appliance applications and otherwise.

The ICB 102 may be configured to provide a switchable coupling with an electrical source 109, such as an electrical panel, electrical circuit, transformer, or the like, providing an electrical power (herein, a line power "LP"), at a given phase n. The ICB 102 further provides such switchable coupling to an electrical circuit 137 and, ultimately, to one or more loads 138. The ICB 102 provides an output power (herein, a switched power "SP"), at the given phase (n), to the electrical circuit 137.

Multiple LP feeds providing alternating currents, at different phases, may be received by an ICB 102 from the electrical source 109. For example, electrical power may be provided at a first-phase LP(1), a second LP(2), and/or a third phase LP(3). After undergoing controlled switching by the ICB 102, such electricity is provided to the electrical circuit 137 as switched/output power (SP) at one or more at a switched first-phase SP(1), a switched second phase SP(2), and/or a switched third phase SP(3). The ICB 102 may include a solid state switching module ("SSWM") 104(n) for each phase of electrical power provided. In FIG. 1, a solid state switching module 104(1) for a single phase is depicted in solid lines. For multiple phase circuits, such as a three-phase circuit, SSWM 104(2) and 104(3) may be used and are shown in dashed lines.

For at least one embodiment of an ICB 102, the SP may be routed thru an electro-mechanical switch ("EMS") 126(n) before being provided to the electrical circuit 137. An EMS 126(n) may be used for each phase (n) provided, as desired for a particular implementation. The EMS 126(n) is further described below. It is to be appreciated that an EMS 126(n) is often not used in conjunction with an ICR 152. A surge protection module 154 may be used. Surge protection modules are well known in the art. In FIGS. 1A and 1B, data lines between the power module 105 and elements are shown for the first phase, whereas data lines for any second and/or third phase components are not shown for purposes of clarity only.

A neutral "N" connection provides a return circuit path back from the electrical circuit 137 (and the load 138) to the electrical source 109, to a ground node, or otherwise. The neutral N may be coupled to a ground potential. A neutral sensor NS 124 may be used to monitor currents transmitted across the neutral connection.

The power module 105 provides monitoring, control, and other features and functions for use in adaptively controlling the electrical power provided by an electrical source 109 to the electrical circuit 137 and a load 138 via a given ICB 102 or ICR 152. By adaptively activating and deactivating one or more switches provided with each SSWM 104(n), the power module 105 may adaptively control, monitor, and regulate electrical power provided to the electrical circuit 137 and/or the load 138. Monitoring of electrical power, by the power module 105, may include use of one or more sensors including, but not limited to, "line power" sensors 120(n), "switched power" sensors 122(n), "relay power" sensors 156(n), "neutral" sensor NS 124, and temperature sensors (not shown). One or more of the line power, switched power, relay power, and/or neutral sensors may be configured to sense currents and/or temperatures. Temperature sensors may be provided separate and/or in conjunction with one or more of the line sensors 120(n), switched sensors 122(n), and/or relay sensors 156(n). As depicted by their absence in FIG. 1B, line power sensors 120(n) and switched power sensors 122(n) may not be used for at least one embodiment of an ICR 152, while relay power sensors 156(n) may not be used for at least one embodiment of an ICB 102. For other embodiments, (not shown), one or more line power sensors 120(n), switched power sensors 122(n), and/or relay power sensors 126(n) may be used interchangeably in an ICB 102 and/or in an ICR 152. Such sensors are further described below.

The power module 105 may include a high voltage (HV) domain 106 that is electrically separated form a low voltage (LV) domain 112 by an isolation barrier 116. A HV-LV communication link 118 facilitates communication of data between the HV domain 106 and the LV domain 112. Such communication link includes use of an HV Comm element 117, and an LV Comm element 119. Each of these components are described in further detail below.

Other elements of the systems 100 and 150 may include, but are not limited to, an AC/DC converter 128, a cooling element 130, an external communications module 132, an external control device 136, and a backup power module 140. Each of these components is described in further detail below.

LPS 120(n)/SPS 122(n)/RPS 156(n) and NS 124

For at least one embodiment for an ICB 101, a line power sensor ("LPS") 120(n) and switched power sensor ("SPS") 122(n) may be provided in a common packaging, module, die, or otherwise for a given phase (n) of line power LP(n). For other embodiments, one or more of the LPS 120(n) and/or SPS 122(n) may be provided in separate packaging, modules, dies, or otherwise from separate a given phase module 102(n).

An LPS 120(n), an SPS 122(n), and/or a relay power sensor ("RPS") 156(n) may be combined in a common packaging, die, module or otherwise with one or more solid-state switches provided by a given SSWM 104(n). For example, and not by limitation, a given SSWM 104(n) may include a power field effect transistor (FET) that includes an integrated sensing FET (herein, a "senseFET").

One or more of the LPS 120(n), SPS 122(n) and/or RPS 156(n) may be provided by use of one or more senseFETs. A senseFET may be configured provide corresponding sensor readings to HV controller 110. Such sensor readings may include one or more of currents, voltages, temperature, or other parameters to the power module 105.

When isolation is to be provided between the HV domain 106 and the LV domain 112, a senseFET may be configured to provide readings from the LPs 102(n) to the LV controller 110 by use of one or more isolated communication links, such as those described herein with regard to the HV-LV communication link 118. Further, an output senseFET may be configured to provide readings from an SPS 122(n) and/or from an RPS 156(n) to the LV controller 114 directly, such as when isolation is not needed, and/or by use of one or more isolating communication link components, when isolation is needed.

A neutral sensor NS 124 may be provided. The NS 124 may be provided in, with and/or separate from a given ICB 102. For at least one embodiment of an ICR 152, a neutral sensor is not utilized. An NS 124 may be provided in an electrical panel and configured to provide sensor readings to two or more phases located within an ICB 102 and using a common neutral node. The NS 124 may be configured to provide sensor readings of currents, voltages, or otherwise.

Each LPS 120(n) may be configured to perform, during power-on or otherwise, one or more self-test operations including, but not limited to, monitoring at least one characteristic of a given LP(n), such as currents and voltages provided to the ICB 102 by the electrical source 109 and for a given phase (n) prior to such electrical power flowing thru or being inhibited by solid-state switches provided by the SSWM 104(n). Each SPS 122(n) may be configured to monitor at least one characteristic of a given SP(n), such as currents and/or voltages for a given phase (n) after electrical power passes thru the switches utilized in the SSWM 104(n), and as such electrical power is output by the ICB 102 to the electrical circuit 137 and used by the load(s) 138. Each RPS 156(n) may be configured to monitor at least one characteristic of a given RP(n), such as currents and/or voltages for a given phase (n) after electrical power passes thru the switches utilized in the SSWM 104(n), and as such electrical power is output by the ICR 152 to the load(s) 138. Each of the LPS 120(n), the SPS 122(n), RPS 156(n), and NS 124 may utilize any known or later arising voltage and/or current sensing technologies, combinations thereof, or otherwise. LPSs 120(n), SPSs 122(n), and/or RPSs 156(n) may be include one or more temperature sensors. Amplifiers may be used, as desired for a given implementation of an embodiment of the present disclosure, to amplify signals provided by one or more of the sensors to the power module 105.

One or more, if not each, of the LPS 120(n), the SPS 122(n), the RPS 156(n), and the NS 124 may be configured to provide one or more sensor readings on a continuous, periodic, on demand, scheduled, or another basis. Readings from each such sensor may be communicated to a low voltage controller 112. Sensor readings for one or more of the LPS 120(n), SPS 122(n), RPS 156(n) and/or NS 124 may be provided on an isolated or non-isolated basis, as desired for any particular implementation of an embodiment of the present disclosure.

At least one of the LPS 120(n), the SPS 122(n), RPS 156(n), and the NS 124 may include use of a sense resistor. It is to be appreciated that a sense resistor commonly is accurate within three to five percent (±3% to ±5%), but provides no isolation, with high insertion losses. Sense resistors may be used, for example and not by limitation, for high bandwidth applications, such as those where switching is within the direct current to 10 MHz range. As used herein, low, medium, high and the like, as used to refer to a particular device characteristic and/or property, are determinable by a person having ordinary skill in the art by comparison with known properties of alternative sensors such as, but not limited to, the sensors identified herein.

At least one of the LPS 120(n), the SPS 122(n), RPS 156(n), and the NS 124 may include use of a Hall-Effect current sensor. The Hall-Effect current sensors may be contact or contact-less sensors, with accuracies respectively ranging within the one to five percent range (±1% to ±5%) for the former and within the five to ten percent range (±5% to ±10%) for the latter. Contact Hall-Effect current sensors may be used to provide, for example and not by limitation, medium level isolation, medium level insertion loss, and for use with high power needs. Switching within the direct current to 1 MHz range may be supported by contact Hall-Effect current sensors. Contactless Hall-Effect current sensors may be used to provide, for example and not by limitation, isolation, zero insertion loss, and for use with high power needs. Switching within the direct current to 100 kHz range may be supported by contactless Hall-Effect current sensors.

At least one of the LPS 120(n), the SPS 122(n), RPS 156(n), and the NS 124 may include use of current sense transformers. Current sense transformers may be used, for example and not by limitation, to provide accuracies within one to five percent range (±1% to ±5%), while providing isolation, zero insertion loss, requiring use of no power supply and supporting switching within the 50 Hz to 1 MHz range.

For at least one embodiment where current sensing accuracy within one percent (±1%) is desired, at least one of the LPS 120(n), the SPS 122(n), RPS 156(n), and the NS 124 may include use of Tunnel Magneto Resistance (TMR) current sensors. TMR current sensors may provide isolation, zero insertion loss, use of a low power supply, and support switching within the direct current to 1 MHz range.

Input/line LP, output/switched SP currents, and relay currents RP may be continuously monitored by respective LPS(n), SPS(n), RPS(n) (one for each phase used in an implementation) to detect whether a leakage current or other current anomaly is occurring within a given electrical circuit, for one or more phases (n). Monitoring for leakage currents and/or other anomalies may be performed, for example, by the LVC 114. When a leakage current is detected, the LVC 114 may instruct the HVC 110 to take appropriate action such as configuring the solid-state switches in the SSWMs 104(n) for the at fault phase and/or for all phase into an open-circuit configuration, or otherwise. It is to be appreciated that leakage current and other anomaly detection, as provided by an ICB 102 and/or ICR 152, may be used in lieu of and/or in addition to ground fault circuit interrupt outlets (GFCI) and/or residual current circuit breakers (RCCB) that commonly used today to prevent leakage currents and other fault and/or hazardous electrical power conditions.

SSWM 104(n)

The solid-state switching module SSWM 104(n) may be configured to include one or more solid-state switches. Two solid-state switches may be used for each phase (n). For other embodiments, any number of solid-state switches may be used for a given phase (n). Various known and/or later arising power switching devices and/or combinations thereof may be used in a given SSWM 104(n).

Figure 2A:
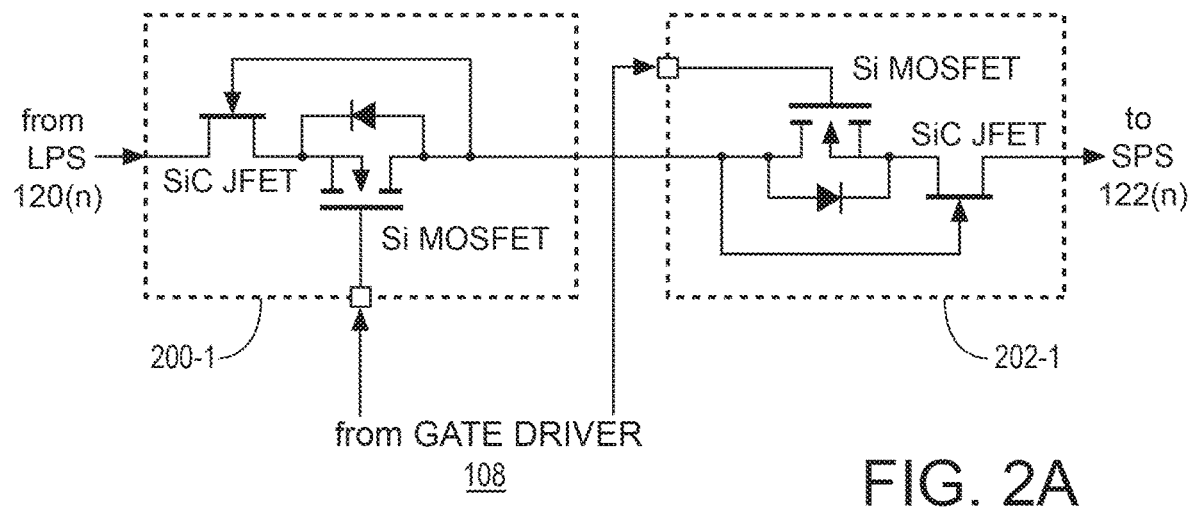
FIGS. 2A, 2B and 2C are schematic diagrams of embodiments of solid-state switching modules configured for use with at least one embodiment of an integrated circuit breaker, integrated relay, and/or integrated contactor and in accordance with at least one embodiment of the present disclosure.

As shown in FIG. 2A and for at least one embodiment of the present disclosure, an SSWM 104(n) may include use of a first switch 200-1, such as a silicon metal-oxide-semiconductor field-effect transistor (Si MOSFET) in a cascode configuration with a silicon carbide junction gate field effect transistor (SiC JFET) that is coupled to a similarly configured second switch 202-1. The gates of each of the Si MOSFETs may be separately or jointly controlled by gate control signals provided by a gate driver 108. It is to be appreciated that first switch 200 and second switch 202 of FIG. 2A may have low losses, as no body diode is used in the SiC JFETs and the Si MOSFETs, and a low reverse recovery charge (Qrrr) may be present. Further, it is to be appreciated that use of a cascoded configuration may result in a lower input resistance and a low Miller capacitance, as compared to other transistor configurations, such as, but not limited to, the transistor configuration of FIG. 2B. The Si MOSFET may be rated for low voltage applications while the SiC JFET may be rated for high voltage applications. Other voltage rating configurations may be used as desired for a given implementation of an embodiment of the present disclosure.

Figure 2B:
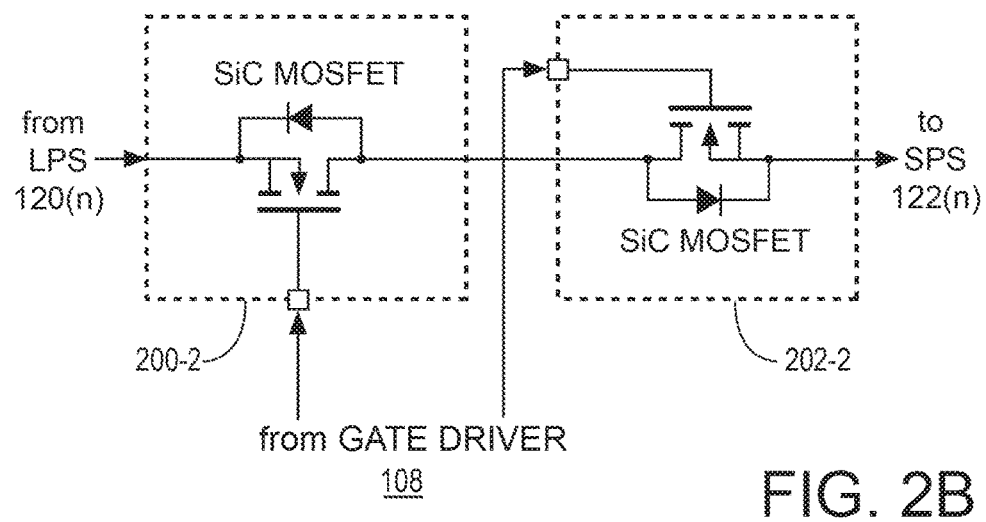
Figure 2C:
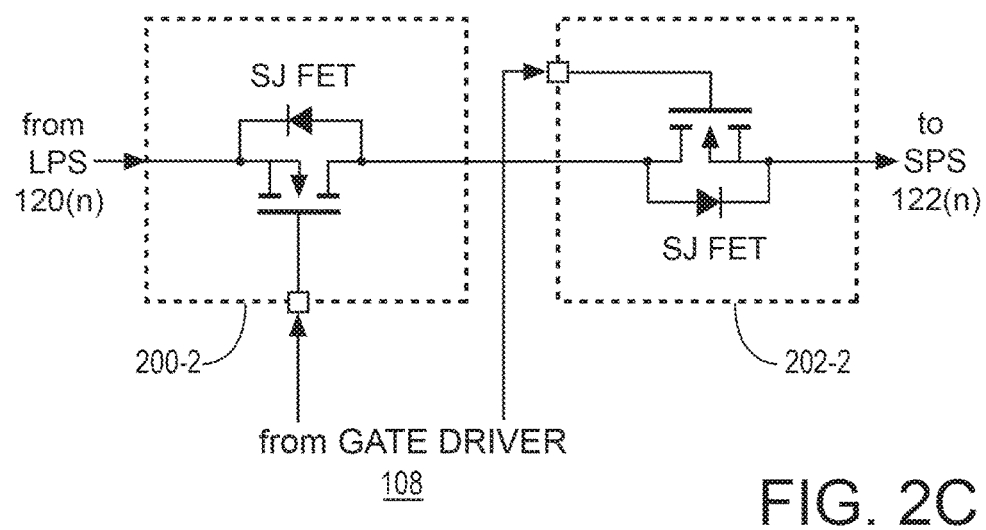

As shown in FIG. 2B and for at least one embodiment of the present disclosure, the SSWM 104(n) may include a first switch 200-2 configured using a silicon carbide metal-oxide-semiconductor field-effect transistor (SiC MOSFET). The first switch 200-2 may be coupled to a similarly configured second switch 202-2. The gates of each of the SiC MOSFETs may be separately or jointly controlled by gate control signals provided by the gate driver 108. It is to be appreciated that the configuration shown in FIG. 2B is simpler than the configuration shown in FIG. 2A, while many of the benefits discussed above with the FIG. 2A configuration may not be realized with the FIG. 2B configuration. Further, it is to be appreciated that other configurations may be used in the SSWM 104(n) including single switch configurations (as compared to the dual switch configurations of FIGS. 2A and 2B), the use of gallium nitride high electron mobility (GaN HEMT) transistors, Si Superjunction FETs (SJ FETS), as shown in FIG. 2C, and the like.

Power Module 105

As discussed above, the power module 105 may include a high voltage (HV) domain 106, an isolation barrier 116, a low voltage (LV) domain 112, an HV Comm element 117, and an LV Comm element 119. The HV Comm element 117 and the LV Comm element 119 facilitate use of the HV-LV communication link 118 between the HV domain 106 and the LV domain 112 while maintaining electrical isolation between the HV domain 106 and the LV domain 112.

HV Domain 106

Figure 3:
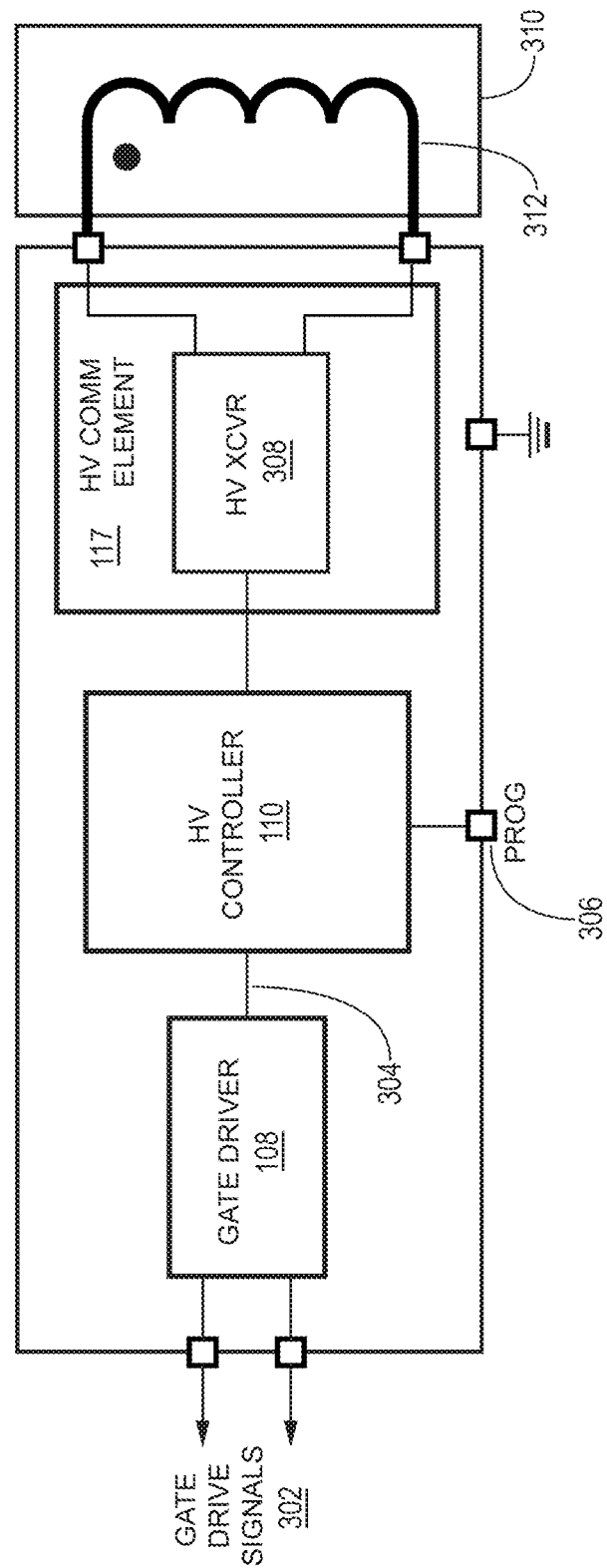
FIG. 3 is a functional block diagram of a high voltage domain for use in an integrated circuit breaker, integrated relay, and/or integrated contactor, and in accordance with at least one embodiment of the present disclosure.

As shown in FIGS. 1A and 1B, as further shown in FIG. 3, and for at least one embodiment of the present disclosure, the HV domain 106 may include a gate driver 108 communicatively coupled to an a HV controller "HVC" 110. The HVC 110 is communicatively coupled to the HV Comm element 117.

Gate Driver 108

The gate driver 108 may be configured to the control operating states (open/closed) of the solid-state switches used in the SSWMs 104(n). The use of gate drive signals 302 to control transistors used in the solid-state switches and thereby voltages, currents and phases of electrical power ultimately provided to the load 138 are well known in the art and are not further described herein. Any such known or later arising switching protocols, methods, components, technologies, or the like may be used for one or more embodiments of the present disclosure. Further, it is to be appreciated that given the use of solid-state switches in the SSWM 104(n), voltages and currents may be provided at any desired voltage potential, current, or the like. Such voltages and currents provided may vary over time or on any other basis—as controlled by the gate drive signals 302 output by the gate driver 108 to the switches provided in the SSWM 104(n).

The gate driver 108 may be configured to receive control signals from the HVC 110 and based thereon, generate gate drive signals 302 which facilitate one or more electrical power management operations, such as wave-shaping. Such wave-shaping may be provided based on load conditions. Load conditions may be detected by the HVC 110 and/or the LVC 114. Wave shaping capabilities may be provided monolithically as an IC with a gate driver, as a multi-die package, as multiple ICs, or otherwise. For at least embodiment, wave shaping capabilities may be provided by, in or with use of one or more of the gate driver 108, the HVC 110, and/or the LVC 114.

The gate driver 108 may be configured to provide adaptive gate driving capabilities. For example, and not by limitation, the gate driver 108 may be configured to facilitate controlled motor and/or other electrical load starting, protection during operation, and shut-down operations (herein, "Motor Operations"). Such motor operations may be based on one or more mathematical models, integrated measurement methods for motors and/or other loads electrical parameters, real-world testing, or otherwise.

For at least one embodiment where two or more phases (n) are to be controlled by the power module 105, the gate driver 108 may be configured to receive control signals from the HVC 110 and based thereon, generate gate drive signals 302, which facilitate other electrical power management operations, such as phase balancing. Such control signals may be generated using a balancing monitor (not shown) provided by one or more of the HVC 110 or the LVC 114. The balancing monitor may be configured to differentially compare current readings for each phase utilized for given circuit. Such current readings may be provided by the LPS(s) 120(n) and/or the SPSs 122(n) (for an ICB 102), and/or by the RPSs 156(n) (for an ICR 152). Results generated by the differential comparisons may be evaluated by a balance logic (not shown) to determine whether one or more of the phases (n) are out of balance. When an out of balance condition is detected, the controller (HVC 110 or LVC 114) facilitating the balance monitoring may be configured to generate one or more out of balance control flag signals which, when communicated to the gate driver 108, result in modifications to one or more gate drive signals provided to one or more of the SSWMs 104(n).

It is to be appreciated that gate drive signals may be provided at any time, based upon detection of a fault condition or otherwise, to facilitate any given operational consideration. For example, gate drive control signals may enable an electrical circuit 137 and/or a load 138 to be powered down in a safe and/or controller manner when a fault condition, such as a phase imbalance, is detected. Likewise, gate drive controls signals may be configured to facilitate other electrical power management operations including, but not limited controlled start-up of loads, minimal power modes (such as when a load is inactive), controlled non-fault condition power downs of loads, emergency condition power downs, or otherwise.

Out of balance flags, other flags and other fault or monitoring condition signals may be used for diagnostic, reporting, monitoring, and/or other capabilities.

HVC 110

The HVC 110 may be provided in any desired form or configuration including, but not limited to, as an application specific integrated circuit (an "ASIC"), a general purpose processor, a micro-controller, or otherwise. The HVC 110 may be configured to facilitate various HVC control functions including, but not limited to, current limiting, overvoltage, over temperature, inrush control, fault management, and other functions (herein, "HVC functions"). The HVC 110 may facilitate such HVC control functions by providing one or more HVC control signals 304 to the gate driver 108. HVC control signals 304 may be provided by the HVC 110 individually, collectively, or otherwise to the gate driver 108 and with respect to one or more of the SSWMs 104(n) used to provide one or more phases (n) of electrical power. HVC control signals 304 may be provided to the gate driver 108 at any given time. HVC control signals 304 may vary over time, by phase (n), and otherwise.

For at least one ICR 152 embodiment, the HVC 110 may also be configured to provide power management functions including, but not limited to, charge pumping, over-voltage/under-voltage management, bandgap, oscillator, internal regulators, and otherwise.

As further shown in FIG. 3, the HVC 110 may include one or more program inputs (PROGs) 306. The PROGs 306 may be used to modify, from time to time or as otherwise determined, one or more parameters used by the HVC 110 in determining the one or more HVC control signals 304 provided to the gate driver 108. PROGs 306 may be provided for each phase (n) of SSWMs 104(n) controlled by the gate driver 108. For other embodiments, a common PROG 306 may be provided for two or more phases (n) of SSWMs 104(n) controlled by a given gate driver 108.

A given HVC 110 may be configured to provide control signals to two or more gate drivers 108; each such gate driver 108 providing gate drive signals with respect to different electrical circuits 137 and/or with respect to different loads 138.

HV Comm Element 117

The HV domain 106 may also be configured to include an HV Comm element 117 configured to facilitate communications with the LV domain 112 over an HV-LV communication link 118 (as shown in FIGS. 1A and 1B). The HV Comm element 117 may use any known or later arising technologies to facilitate such communications. Such communications may be serial, parallel, duplex, bi-directional, unidirectional (by and between the HV domain 106 and the LV domain 112), or otherwise.

Such communications are facilitated while isolation is maintained between the HV domain 106 and the LV domain 112. Such isolation and communications may be facilitated by use of an HV transceiver "HV XCVR" 308 coupled to an HV interface 310. As shown in FIG. 3 and the HV interface 310 may be configured as a first inductive coil 312. It is to be appreciated that other forms of HV Interface 310 technologies may be used for other embodiments to facilitate isolated communications between the HV domain 106 and the LV domain 112. Non-limiting examples of such interface technologies include capacitive isolation, opto-coupling, combinations of any of the foregoing, and otherwise.

LV Domain 112

Figure 4A:
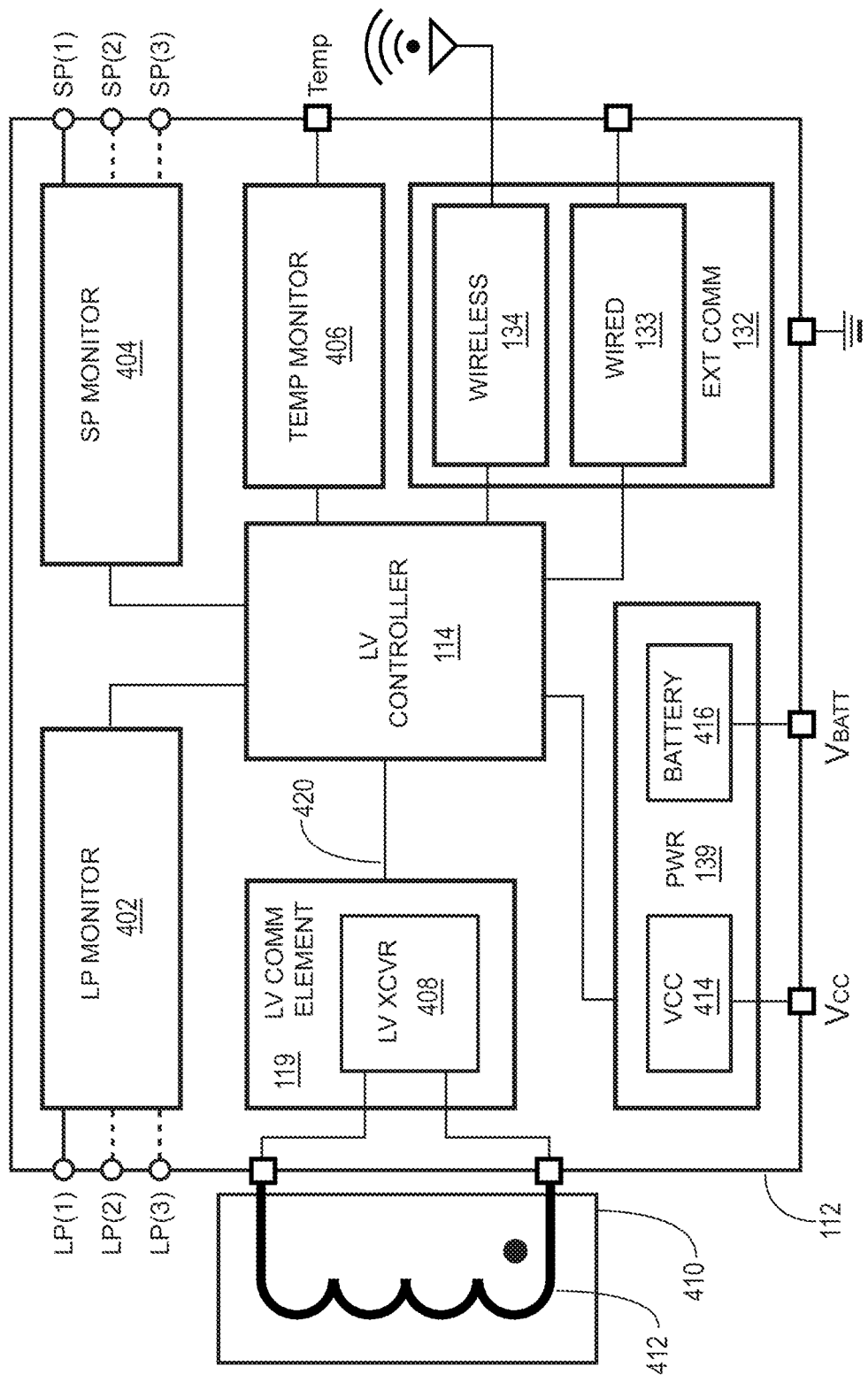
FIG. 4A is a functional block diagram of a low voltage domain for use in an integrated circuit breaker and in accordance with at least one embodiment of the present disclosure.
Figure 4B:
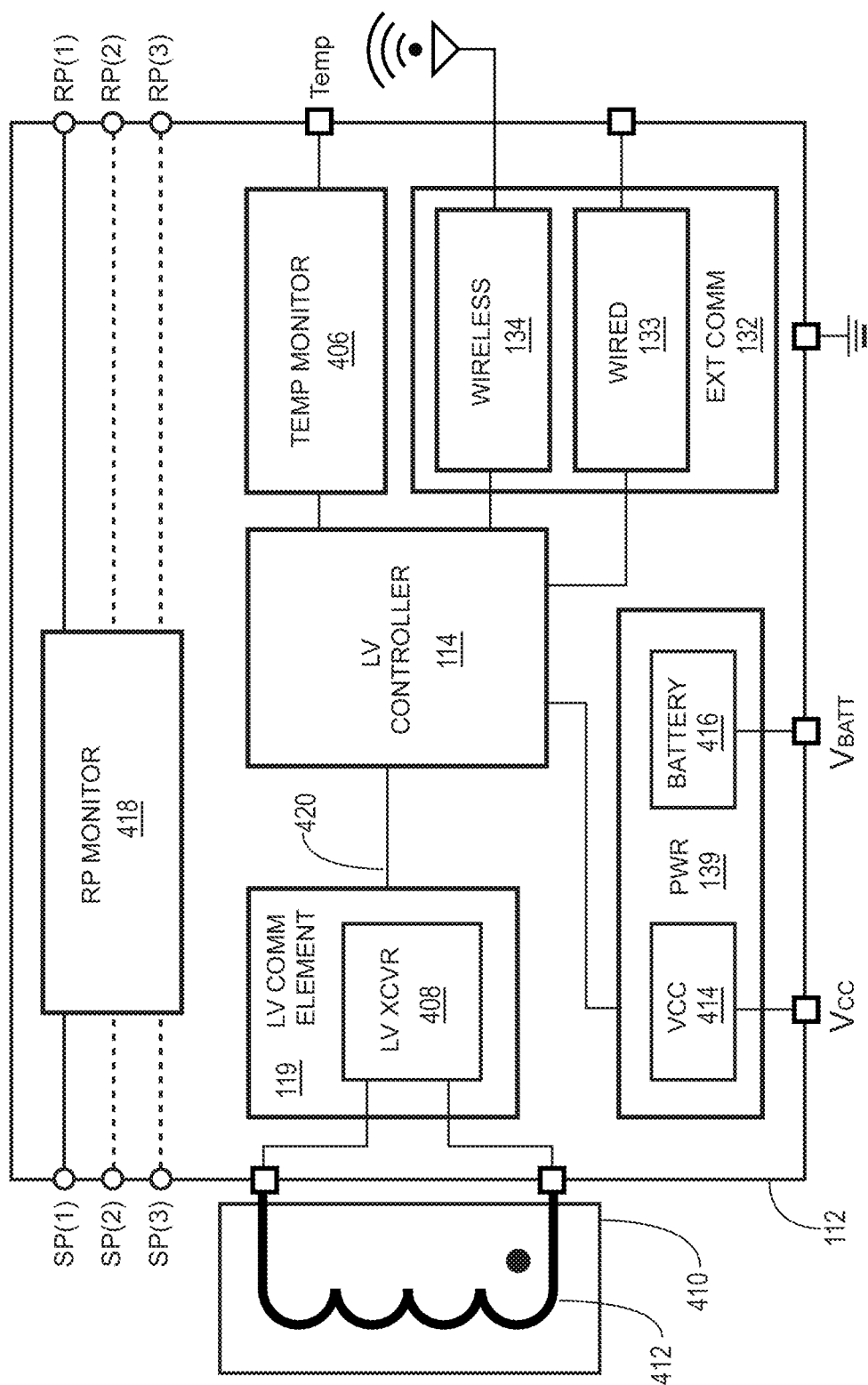
FIG. 4B is a functional block diagram of a low voltage domain for use in an integrated relay and in accordance with at least one embodiment of the present disclosure.

As shown in FIG. 4A and for at least one embodiment of the present disclosure for an ICB 102, the LV domain 112 may be configured to include an LP monitor 402, an SP monitor 404, a temperature monitor 406, an LV transceiver ("LV XCVR") 408, an LV controller 114, an LV Comm element 119, an external communications module ("EXT COMM") 132, and an LV power controller module (PWR) 139. As shown in FIG. 4B and for at least one embodiment of the present disclosure for an ICR 152, the LV domain 112 may be configured to include the above mentioned elements, with the LP monitor 402 and SP monitor 404 being replaced by an RP monitor 418.

As further shown in FIGS. 4A and 4B, an LV interface 410 may be used to facilitate isolated communications between the LV domain 112 and the HV domain 106. As shown, the LV interface 410 may include use, for example, of a second inductive coil 412. It is to be appreciated that other forms of HV Interface 310 and LV Interface 410 technologies may be used for other embodiments to facilitate isolated communications between the HV domain 106 and the LV domain 112. As discussed above, non-limiting examples of such interface technologies include capacitive isolation, opto-coupling, combinations of any of the foregoing, and otherwise.

LP Monitor 402/SP Monitor 404/RP Monitor 418/Temp Monitor 406

In accordance with at least one embodiment, the LP Monitor 402, SP Monitor 404, RP Monitor 418, and/or Temp Monitor 406 may be configured to monitor sensor readings provided, as applicable, by one or more of the LPS 120(n), SPS 122(n), RPS 156(n), or otherwise. Such sensor readings may be monitored for any desired detectable condition(s). One or more flags may be raised by the monitors when anomalous power conditions are detected.

LVC 114

The LVC 114 may be provided in any desired form or configuration including, but not limited to, as an application specific integrated circuit (an "ASIC"), a general purpose processor, a micro-controller, or otherwise. The LVC 114 may be configured to facilitate, augment and/or support various HVC control functions. The LVC 114 may facilitate such HVC control functions by providing one or more LVC commands 420 to the HVC 110 which result in one or more HVC control signals 304 being provided to the gate driver 108. LVC commands 420 may be provided by the HVC 110 individually, collectively, or otherwise. LVC commands 420 may be provided to the HVC 110 at any given time. LVC commands 420 may vary over time, by phase (n), and otherwise.

EXT COMM 132

As shown in FIGS. 4A and 4B and the LV domain 112 may include an external communications module EX COMM 132. The EX COMM 132 may include at least one of a wired interface 133 and a wireless interface 134. Such components are discussed further below.

PWR 139

As shown in FIGS. 4A and 4B and the LV domain 112 may include a power controller module (PWR) 139. The PWR may include a VCC power controller 414 and a battery controller 416. The VCC power controller 414 may be configured to provide a consistent input voltage and current to the LVC 114 and, when needed, to the HVC 110. The batter controller 416 may be configured to provide a consistent input voltage and current to the LVC 114 and the HVC 110 when power is not available from the VCC power controller 414. The battery controller 416 may also be configured to provide electrical power, as needed, to one or more of the components provided in HV domain 106 and the LV domain 112 including, but not limited to, the gate drivers 108, transceivers 308/408, EX COMM 132 and otherwise. A battery may be used to provide electricity to the LVC 114 for communication and/or diagnostic purposes, such as fault detection and reporting, when VCC power is not available or reliable, or otherwise.

LV Comm Element 119

The LV domain 112 may also be configured to include an LV Comm element 119 configured to facilitate communications with the HV domain 106 over an HV-LV communication link 118 (as shown in FIGS. 1A and 1B). The LV Comm element 119 may use any known or later arising technologies to facilitate such communications. Such communications may be serial, parallel, duplex, bi-directional, unidirectional (by and between the HV domain 106 and the LV domain 112), or otherwise.

Such communications are facilitated while isolation is maintained between the HV domain 106 and the LV domain 112. Such isolation and communications may be facilitated by use of an LV transceiver "LV XCVR" 408 coupled to an LV interface 410. As shown in FIGS. 4A and 4B and the LV interface 410 may be configured as a second inductive coil 412. It is to be appreciated that other forms of LV Interface 410 technologies may be used for other embodiments to facilitate isolated communications between the HV domain 106 and the LV domain 112. Non-limiting examples of such interface technologies include capacitive isolation, opto-coupling, combinations of any of the foregoing, and otherwise.

AC/DC Converter 128

As further shown in FIGS. 1A and 1B, an AC/DC converter 128 may be used to provide electrical power to the LV domain 112 and/or to the HV domain 106. Any known or later arising technologies may be used for the AC/DC converter 128.

Cooling Element 130

As further shown in FIGS. 1A and 1B a cooling element 130 may be used to provide adaptive cooling to the ICB 102 and/or ICR 152. Active and/or passive cooling may be provided by the cooling element 130. Any known or later arising cooling technologies may be used. Non-limiting examples of passive cooling technologies include heat sinks, heat fins, heat plates and the like. Non-limiting examples of active cooling technologies include fans and heat pipes or carbon nanotubes, thermoelectric cooling, liquid cooling, direct immersion, cryogenics, and the like. The cooling element 130 may be controlled by the LVC 114.

EX COMM 132 and External Control Device 136

As shown in FIGS. 1A, 1B, 4A and 4B, an ICB 102 and ICR 152 may include an external communications module "COM" 132. The COM 132 may be communicatively coupled to one or more external control devices 136. External control device(s) may include one or more devices configured for remote monitoring, control, reporting, and the like of one or more ICBs 102 and/or ICRs 152. Non-limiting examples of user control devices include smart phones, laptop computers, tablet computing device, desktop computers, remote servers, web interfaces, artificial intelligence systems, and the like. Any known or later arising technologies compatible with supporting one or more remote control and/or monitoring features and functions of an embodiment of the present disclosure may be used, in whole or in part, to provide an external control device 136. Further, such external control device 136 may be co-located with an ICB 102 or ICR 152, such as in a given electrical box, proximately located, such as within a vehicle, building, or other structure in which the IBC 102 or ICR 152 is physically located, or remotely, such as being separated by a geographic distance that is greater than a given local network, Wi-Fi, or other limited distance signal range. For at least one embodiment, the external user device 136 may be communicatively coupled to the ICB 102 and/or ICR 152 by use of the Internet, a local area network (LAN), a wide area network (WAN), a cellular network, or otherwise.

As further shown, the user device 136 may be communicatively coupled to the ICB 102 and/or ICR 152 by use of one or more wired links, as facilitated by COMM port 133, and/or wireless links, as facilitated by a transceiver 134. It is to be appreciated that any known or later arising communications devices, systems, network, protocols, technologies, and combinations thereof (herein individually and collectively, "communications technologies") may be used to facilitate communications between an ICB 102 and/or ICR 152 and an external control device 136. Non-limiting examples of such communications technologies may include Ethernet, Wi-Fi, BLUETOOTH, ZIGBEE, I$^2$C, serial-peripheral interfaces (SPI), cellular (such as 3G, 4G and 5G), and otherwise. The COMM 132, ports 132, transceivers 134, external control device 136, and communications technologies may be configured to support diagnostic reporting, fault reporting, control of the ICB 102 and/or ICR 152 by an external control device 136.

Backup Power Module 140

As shown in FIGS. 1A and 1B, the system 100 may include a backup power module 140 that is electrically coupled to the LVC 114. For at least one embodiment, the backup power module 140 may include a battery, which may be rechargeable. For at least one embodiment, the backup power module 140 may include use of a solar cell, a wind turbine, or other power technologies. For at least one embodiment and during a power failure condition, the backup power module 140 may be configured to provide sufficient electrical power to the LVC 114 for the LVC 114 to detect fault conditions, run diagnostic test, conduct one or more fail-safe operations in response thereto, communicate status information to external control device(s) 136 by providing electrical power to the EX COMM 132 and related communications components, and otherwise.

ECM 126(*n*)

As shown, an electro-mechanical switch ECM 126(*n*) may be used to couple the ICB 102 with the load 138. The ECM 126(*n*) may be used to comply with various governmental regulations, electrical codes, and the like, such as those requiring a providing of an air gap between an electrical panel and a load. Examples of such regulations, codes and the like include, but are not limited to, UNDERWRITER LABORATORIES standard UL489, the entire contents of which are incorporated herein by reference and in accordance with which each embodiment of the present disclosure may be configured to be compliant therewith by inclusion of known technologies. It is to be appreciated that should the requirements of UL489, and the like, be rescinded or otherwise modified, including but not limited to the removal of a requirement for an air gap, the electro-mechanical switch 126(*n*) may be excluded from embodiments of the present disclosure and the various embodiments of the present disclosure may be modified to comply with such changes.

Various embodiments of the present disclosure may provide integrated module solutions for circuit breaker and/or relay applications. Implementations may use ICs within a module package to provide an ICB 102 and/or an ICR 152 with functions such as, but not limited to: external communication, adjustable and adaptive gate driving, programmable gate driving, system diagnostics, and backup fault reporting. Some embodiments may include a backup battery in order to operate in a back-up mode for diagnostics and "fail-safe" operations in case input power is removed. Implementations may include diagnostic and fault reporting as well as wireless or wired communication in order to allow external users, programs, or devices to receive and/or respond to the system's status. Embodiments may allow for a small footprint, fast response time, and/or long lifetime of devices through the replacement, reduction, or elimination of mechanical components needed.

Some embodiments of the present disclosure may provide ICR 152 solutions for integrated electronic relay (herein, "IERs") and/or integrated electronic contactor (herein, "IECs") applications. Embodiments of IERs and/or IECs may include functions such as, but not limited to smooth switching, backup fault reporting, wireless diagnostics, and integrated AC to DC converters. Some embodiments may include a backup battery in order to operate in a back-up mode for diagnostics and "fail-safe" operations in case input power is removed. Implementations may include diagnostic and fault reporting as well as wireless or wired communication in order to allow external users or programs to receive and/or respond to the system's status. Embodiments of IECs may reduce or eliminate arcing due to the reduction or elimination of mechanical parts. Embodiments may reduce the need for additional fuses by using the overvoltage protection and active clamp shutdown of the HV domain. Embodiments may allow for a small footprint, fast response time, and/or long lifetime of devices through the replacement, reduction, or elimination of mechanical components needed. Embodiments of the present disclosure may be configured for any practical use including, but not limited to, uses in industrial, residential, commercial, automotive, aerospace, and other switchable controlled electrical current applications.

The present technology has been described above with reference to several exemplary embodiments. However, changes and modifications may be made to the exemplary embodiments without departing from the scope of the present technology. For example, while an exemplary embodiment may describe a multi-IC module or an integrated driver one of skill in the art will understand the system may be accomplished with other methods capable of performing similar functions. In addition, exemplary specifications such as voltage values may have been described, but one of skill in the art will understand the present technology is not limited to such specifications. These and other changes or modifications are intended to be included within the scope of the present technology.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. While the various figures used herein show various circuit embodiments, it is to be appreciated that other embodiments (not shown) may modify, reconfigure, add, and/or remove one or more circuit components, connections, couplings, or the like. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. An integrated circuit breaker comprising:
  a first solid state switching module, configured to receive a first line power having a first phase from an electrical source, switchable control the first phase, and output a first switched power at the first phase, via an electrical circuit, to a load;
  a first line power sensor, configured to sense at least one characteristic of the first phase;
  a first switched power sensor, configured to sense at least one characteristic of the first phase; and
  a power module, coupled to each of the first solid state switching module, the first line power sensor, and the first switched power sensor, the power module configured to control operating states of the first solid state switching module based upon at least one sensor reading received from at least one of the first line power sensor and the first switched power sensor, the power module comprising a high voltage controller and a low voltage controller configured to perform at least one of:
    monitoring operating conditions of the integrated circuit breaker;
    generating diagnostic data representative of the operating conditions;
    responding to commands received from an external control device; or
    communicating low voltage control signals to the high voltage controller.

2. The integrated circuit breaker of claim 1, wherein the first solid state switching module comprises at least one solid-state switch; and
  wherein the at least one solid-state switch comprises at least one of:
    a silicon metal-oxide-semiconductor field-effect transistor (a "Si MOSFET") in a cascode configuration with a silicon carbide junction gate field effect transistor (a "SiC JFET");
    a first silicon carbide metal-oxide-semiconductor field-effect transistor (a "SiC MOSFET");
    a silicon superjunction metal-oxide-semiconductor field effect transistor (an "SJ FET"); and
    a gallium nitride high electron field effect transistor (a "GaN FET").

3. The integrated circuit breaker of claim 1, wherein the first line power sensor is configured to sense first phase currents;
  wherein the first switched power sensor is configured to sense first phase currents; and
  wherein at least one of the first line power sensor and the first switched power sensor are configured to sense temperature;
  wherein the first line power sensor and the first switched power sensor each further comprise at least one of:
    an integrated sensing field effect transistors (a "senseFET");
    a sense resistor;
    a Hall-Effect current sensor;
    a current sense transformer; and
    a tunnel magneto resistance ("TMR") current sensor.

4. The integrated circuit breaker of claim 1, comprising:
  a second solid state switching module, configured to receive a second line power having a second phase from the electrical source, switchable control the second phase, and output a second switched power at the second phase to the load;
  a second line power sensor, configured to sense at least one characteristic of the second phase;
  a second switched power sensor, configured to sense at least one characteristic of the second phase; and
  wherein the power module is further coupled to each of the second solid state switching module, the second phase and the second switched power sensor;
  wherein the power module is further configured to control operating states of the first solid state switching module and the second solid state switching module based upon at least one sensor reading received by the power module from at least one of the first line power sensor, the second line power sensor, the first switched power sensor, and the second switched power sensor.

5. The integrated circuit breaker of claim 1, further comprising:
a neutral line sensor configured to sense at least one characteristic of a neutral line providing an electrical return path from the load, via the electrical circuit, to the electrical source.

6. The integrated circuit breaker of claim 1, wherein the power module comprises a high voltage domain comprising:
a gate driver coupled to the first solid state switching module;
the high voltage controller, coupled to the gate driver, configured to provide high voltage control signals to the gate driver;
wherein based on the high voltage control signals, the gate driver generates gate drive signals which configure one or more switches provided by the first solid state switching module into open circuit or closed circuit operating states; and
a high voltage communications element configured to facilitate coupling of the high voltage controller with the low voltage controller.

7. The integrated circuit breaker of claim 1:
wherein the power module comprises:
a low voltage domain comprising:
the low voltage controller:
a line power monitor, coupled to the first line power sensor and to the low voltage controller, configured to receive sensor readings from the first line power sensor monitor the received sensor readings, and generate at least one line power flag when an anomalous line power condition arises;
a switched power monitor, coupled to the first switched power sensor and the low voltage controller, configured to receive sensor readings from the first switched power sensor, monitor the received sensor readings, and generate at least one switch power flag when an anomalous switch power condition is detected; and
a low voltage communications element configured to facilitate coupling of the low voltage controller with the high voltage controller.

8. The integrated circuit breaker of claim 1;
wherein the power module comprises:
a low voltage domain comprising:
a temperature monitor;
wherein the temperature monitor monitors temperatures of the first phase;
a power controller module;
wherein the power controller module couples the low voltage domain with a backup power source; and
an external communications module; and
wherein the external communications module couples the integrated circuit breaker with an external control device.

9. The integrated circuit breaker of claim 1, wherein the low voltage control signals result in a generation of gate drive signals that facilitate at least one of electrical power management operations; and
wherein the electrical power management operations comprise at least one of wave-shaping, wave-balancing, fail safe, start-up, minimal power modes, emergency condition power downs, and charge pumping.

10. The integrated circuit breaker of claim 1, further comprising:
a cooling element configured to provide at least one of active cooling and passive cooling to the integrated circuit breaker.

11. An integrated circuit relay module comprising:
a first solid state switching module, configured to receive a first switched power having a first phase from an electrical circuit, switchable control the first phase, and output a first relay power at the first phase to a load;
a first relay power sensor, configured to sense at least one characteristic of the first phase; and
a power module, coupled to each of the first solid state switching module, and
the first relay power sensor, the power module configured to control operating states of the first solid state switching module based upon at least one sensor reading received by the power module from the first relay power sensor, the power module configured to perform at least one of:
monitoring operating conditions of the integrated circuit breaker;
generating diagnostic data representative of the operating conditions;
responding to commands received from an external control device; or
communicating low voltage control signals to a high voltage controller.

12. The integrated circuit relay module of claim 11, further comprising:
a surge protection module configured to shunt a power surge to ground arising on the first phase.

13. The integrated circuit relay module of claim 11, further comprising:
a second solid state switching module, configured to:
receive a second switched power having a second phase from the electrical circuit,
switchable switchably control the second phase, and
output a second relay power at the second phase to the load; and
a second relay power sensor, configured to sense at least one characteristic of the second relay power;
a third solid state switching module, configured to:
receive a third switched power having a third phase from the electrical circuit,
switchably control the third phase, and
output a third relay power at the third phase to the load; and
a third relay power sensor, configured to sense at least one characteristic of the third phase;
wherein the power module is further coupled to each of the second solid state switching module, the third solid state switching module, the second relay power sensor, and the third relay power sensor; and
wherein the power module is configured to control operating states of one or more of the first solid state switching module, the first solid state switching module, and the first solid state switching module based upon at least one sensor reading received from one or more of the first relay power sensor, the second relay power sensor, and the third relay power sensor.

14. The integrated circuit relay module of claim 11, wherein the power module comprises a low voltage domain coupled to, and electrically isolated from, a high voltage domain;
wherein the low voltage domain further comprises:
a low voltage controller;
a relay power monitor, coupled to the first relay power sensor and the low voltage controller, configured to receive sensor readings from the first relay power sensor, monitor the received sensor readings, and generate at least one relay power flag when an anomalous relay power condition is detected;

a low voltage communications element configured to facilitate coupling of the low voltage domain with the high voltage domain;

a temperature monitor;

wherein the temperature monitor monitors temperatures of one or more of the first phase;

a power controller module;

wherein the power controller module couples at least the low voltage domain with a backup power source; and an external communications module coupling the integrated circuit breaker with an external control device; and wherein the low voltage controller is configured to monitor operating conditions of the integrated circuit relay module, generate diagnostic data representative of the operating conditions, respond to commands received from the external control device, and output low voltage control signals to the high voltage domain for facilitating control of operating states of one or more of the first solid state switching module, second solid state switching module, and third solid state switching module.

15. The integrated circuit relay module of claim 11, wherein the power module comprises a low voltage domain coupled to a high voltage domain; wherein the high voltage domain is further coupled to the first solid state switching module; wherein the high voltage domain further comprises: a gate driver configured to control the operating states of the first solid state switching module; a high voltage controller, coupled to the gate driver, configured to provide high voltage control signals to the gate driver; wherein based on the high voltage control signals, the gate driver generates gate drive signals which configure one or more switches provided by the first solid state switching module into an open circuit operating state or a closed circuit operating state; and wherein, the gate drive signals facilitate at least one of electrical power management operations comprising wave-shaping, wave-balancing, fail safe operations, start-up operations, minimal power modes, emergency condition.

16. A system, comprising:

an integrated circuit breaker configured to receive a line power from an electrical source and output a switched power;

an electro-mechanical switch configured to receive the switched power from the integrated circuit breaker, provide an air gap between the electrical source and an electrical circuit, and controllable output the switched power;

an electrical circuit electrically coupled to the electro-mechanical switch and configured to receive and provide the switched power to at least one of a first load and a second load; and an integrated circuit relay module electrically coupled to the electrical circuit and configured to output a relay power, the integrated circuit relay module comprising:

a first solid state switching module, configured to:
receive the switched power from the electrical circuit,
switchably control the switched power, and
output the relay power to the first load;

a relay power sensor, configured to sense at least one characteristic of the relay power; and a first power module, coupled to each of the first solid state switching module and the relay power sensor, the first power module configured to control operating states of the first solid state switching module based upon at least one sensor reading received from the relay power sensor;

wherein the first load receives the relay power from the integrated circuit relay module;

wherein the second load receives the switched power from the electrical circuit;

wherein the integrated circuit breaker is configured to monitor, detect, and respond to at least one characteristic of the line power and the switched power; and wherein the integrated circuit relay module is configured to monitor, detect, and responds to at least one characteristic of the relay power.

17. The system of claim 16, wherein the integrated circuit breaker further comprises:

a second solid state switching module, configured to receive the line power, switchable control the line power, and output the switched power to the electro-mechanical switch;

a line power sensor, configured to sense at least one characteristic of the line power;

a switched power sensor, configured to sense at least one characteristic of the switched power; and a second power module, coupled to each of the second solid state switching module, the line power sensor, and the switched power sensor, configured to control operating states of the second solid state switching module based upon at least one sensor reading received by the power module from at least one of the line power sensor and the switched power sensor.

18. The system of claim 16, wherein the integrated circuit relay module further comprises an active cooling element including at least one of a fan, a heat pipe, a carbon nanotube, thermoelectric cooling, liquid cooling, direct immersion, or cryogenics.

* * * * *